(12) United States Patent
Muraoka

(10) Patent No.: US 10,402,736 B2
(45) Date of Patent: Sep. 3, 2019

(54) EVALUATION SYSTEM, EVALUATION METHOD, AND COMPUTER-READABLE STORAGE MEDIUM

(71) Applicant: NEC Corporation, Tokyo (JP)

(72) Inventor: Yusuke Muraoka, Tokyo (JP)

(73) Assignee: NEC Corporation, Tokyo (JP)

(*) Notice: Subject to any disclaimer, the term of this patent is extended or adjusted under 35 U.S.C. 154(b) by 409 days.

(21) Appl. No.: 15/123,053

(22) PCT Filed: Mar. 3, 2015

(86) PCT No.: PCT/JP2015/001100
§ 371 (c)(1),
(2) Date: Sep. 1, 2016

(87) PCT Pub. No.: WO2015/136885
PCT Pub. Date: Sep. 17, 2015

(65) Prior Publication Data
US 2016/0371596 A1 Dec. 22, 2016

(30) Foreign Application Priority Data
Mar. 10, 2014 (JP) .................. 2014-046314

(51) Int. Cl.
*G06N 5/04* (2006.01)
*G06F 16/2458* (2019.01)
(Continued)

(52) U.S. Cl.
CPC ............. *G06N 5/048* (2013.01); *G06F 16/22* (2019.01); *G06F 16/2465* (2019.01); *G06Q 10/04* (2013.01)

(58) Field of Classification Search
CPC .............. G06N 5/048; G06F 17/30312; G06F 17/30539; G06F 17/18; G06F 11/00;
(Continued)

(56) References Cited

U.S. PATENT DOCUMENTS

| | | | | |
|---|---|---|---|---|
| 2001/0020284 A1* | 9/2001 | Tsuda | .................... | G06F 11/008 714/37 |
| 2004/0002929 A1* | 1/2004 | Kim | ........................ | G06F 17/18 706/21 |

(Continued)

FOREIGN PATENT DOCUMENTS

| | | | |
|---|---|---|---|
| JP | 07262172 A | * | 10/1995 |
| JP | 2001-306999 A | | 11/2001 |

(Continued)

OTHER PUBLICATIONS

International Search Report corresponding to PCT/JP2015/001100, dated Mar. 31, 2015 (3 pages).

*Primary Examiner* — Kamran Afshar
*Assistant Examiner* — Brent Johnston Hoover
(74) *Attorney, Agent, or Firm* — Wilmer Cutler Pickering Hale and Dorr LLP

(57) ABSTRACT

Facilitate the procedure of evaluating a predictor.
This evaluation system comprises an input receiving unit via which elements constituting an evaluation index are specified and an evaluation-index calculation unit that calculates an evaluation-index value for a data set. The evaluation index comprises an element of a first type that evaluates the sample data, an element of a second type that applies weights to the sample data, and an element of a third type that performs a statistical process on a plurality of sample data based on information outputted by the element of the first type and the element of the second type. The evaluation-index calculation unit calculates the above-mentioned evaluation-index value based on the evaluation index comprising the elements received by the input receiving unit.

8 Claims, 9 Drawing Sheets

(51) Int. Cl.
*G06Q 10/04* (2012.01)
*G06F 16/22* (2019.01)

(58) Field of Classification Search
CPC .......... G06F 11/008; G06F 7/06; G06F 17/30;
G06F 16/22; G06F 16/2465; G06Q 10/04;
G06Q 10/10; G06Q 10/06393; G06E
1/00; H04L 2025/03426; H04L 25/204
USPC ................. 706/52, 21, 15; 707/603; 714/37
See application file for complete search history.

(56) References Cited

U.S. PATENT DOCUMENTS

2007/0010966 A1* 1/2007 Kim ..................... G06F 17/18
702/181
2007/0063772 A1* 3/2007 Carichner ............. H03F 1/3241
330/149
2010/0153332 A1* 6/2010 Rollins ................. G06Q 10/10
707/603

FOREIGN PATENT DOCUMENTS

| JP | 2009033686 A | * | 2/2009 | |
| JP | 2010-146554 A | | 7/2010 | |
| JP | 2010146554 A | * | 7/2010 | ............. G06Q 10/10 |
| WO | WO-2016010601 A2 | * | 1/2016 | ............. G06N 3/084 |
| WO | WO-2017072869 A1 | * | 5/2017 | ....... G06Q 10/06393 |

\* cited by examiner

Fig. 2

| ID | PREDICTED VALUE (°C) | MEASURED VALUE (°C) |
|---|---|---|
| 2014/1/1 | 10 | 11 |
| 2014/1/2 | 12 | 12 |
| 2014/1/3 | 9 | 10 |
| 2014/1/4 | 8 | 8 |
| 2014/1/5 | 14 | 13 |
| 2014/1/6 | 7 | 5 |
| 2014/1/7 | 10 | 10 |
| 2014/1/8 | 9 | 9 |
| 2014/1/9 | 10 | 11 |
| 2014/1/10 | 9 | 8 |
| 2014/1/11 | 6 | 8 |
| ... | ... | ... |

Fig. 3

| ID | TYPE OF ELEMENT | NAME OF ELEMENT | PARAMETER |
|---|---|---|---|
| 1 | loss | Absolute Error | NOT EXIST |
| 2 | loss | Abnormal Value | EXIST |
| 3 | loss | Squared Error | NOT EXIST |
| 4 | Sampling | All | NOT EXIST |
| 5 | Sampling | Train | NOT EXIST |
| 6 | Sampling | Test | NOT EXIST |
| 7 | Sampling | Range | EXIST |
| 8 | Sampling | Custom | EXIST |
| 9 | Statistics | Median | NOT EXIST |
| 10 | Statistics | LowerMean | EXIST |
| 11 | Statistics | UpperMean | EXIST |
| 12 | Summary | AndAll | EXIST |
| 13 | Summary | Wmean | EXIST |
| ... | ... | ... | ... |

EVALUATION SYSTEM, EVALUATION METHOD, AND COMPUTER-READABLE STORAGE MEDIUM

CROSS-REFERENCE TO RELATED APPLICATIONS

This application is a national stage application of International Application No. PCT/JP2015/001100 entitled "Evaluation System, Evaluation Method, and Computer-Readable Storage Medium," filed on Mar. 3, 2015, which claims the benefit of the priority of Japanese Patent Application No. 2014-046314, filed on Mar. 10, 2014, the disclosures of each of which are hereby incorporated by reference in their entirety.

TECHNICAL FIELD

The present invention relates to data mining.

BACKGROUND ART

Data mining is an art for finding out useful knowledge out of a large amount of data by analyzing the data. Business operators intend to further enhance added value of their businesses by using the knowledge which is acquired by data mining.

Some of typical examples of data mining application will be explained in the following. There is a case that data mining is used for predicting an unknown phenomenon based on known data. For example, weather forecast is one of the typical examples of applying data mining. In the case of the weather forecast, a data mining system predicts a future weather based on data on the past weather. Moreover, a data mining system predicts, for example, a medicinal effect of a compound based on data of the compound.

Here, 'predictor' will be explained in the following. According to a data mining system, 'predictor' is used, for example, when predicting an unknown phenomenon based on known data. The predictor is a function which takes a value of an explanation variable as input and outputs a prediction result. According to the data mining system, known data is inputted into the predictor as a value of the explanation variable. Consequently, the predictor outputs the prediction result. The prediction result which is outputted by the predictor is hereinafter expressed as 'predicted value' unless otherwise noted.

Whether the data mining system may appropriately predict the unknown phenomenon or not strongly depends on whether an appropriate predictor is used or not.

A business operator considers to apply the knowledge, which is acquired by data mining, to its business. In this case, the business operator is eager to confirm a reliability of the prediction result which is outputted by the data mining system. Then, to 'evaluate' the predictor is carried out by use of a computer.

In the case that the computer carries out 'evaluation' on the predictor, it is evaluated how appropriate prediction results (that is, predicted values) the predictor outputs for the value of the explanation variable inputted.

In the following explanation, a module used for the purpose of evaluating the predictor when the computer carries out a process of evaluating the predictor is called 'evaluation module'.

One of method for evaluating whether the predictor is appropriate or not is to compare the predicted value which is outputted by the predictor and an observed value which corresponds to the predicted result. For example, a case when a data mining system carries out a weather forecast is considered. For example, it is assumed that, at a time of Jan. 1, 2014, the data mining system predicts by use of a certain predictor that the highest temperature of tomorrow (Jan. 2, 2014) is 10° C. (° C. represents temperature in Celsius). It is also assumed that the actual highest temperature of Jan. 2, 2014 is 11° C. The evaluation module evaluates the predictor, for example, at a time of Jan. 2, 2014, by comparing the predicted result (that is, 10° C.) and the observed value of the highest temperature (that is, 11° C.) of Jan. 2, 2014.

Here, it is assumed that the data mining system predicts, using a certain predictor, the highest temperature of each day for one year. The evaluation module compares, for example, the predicted value and the observed value corresponding to the predicted value for each of the data accumulated for one year. By comparing as mentioned above, the evaluation module may statistically analyze a degree of difference between the predicted value and the observed value. For example, the evaluation module calculates a mean value or a variance value of differences between the predicted values and the observed values which are accumulated for one year. Based on the statistical analysis mentioned above, the evaluation module evaluates the predictor.

NPL 1 discloses a programming language for statistical analysis, and a development and execution environment thereof. An art which NPL 1 discloses includes various functions which are used for evaluating the predictor.

CITATION LIST

Non Patent Literature

[NPL 1] "R", [online], [retrieved at Mar. 3, 2014], Internet <URL: http://www.r-project.org/>

SUMMARY OF INVENTION

Technical Problem

When an operator tries to evaluate the predictor by use of the art which is disclosed in NPL1, the operator is obliged to carry out a complicated work. That is, the art disclosed in NPL 1 has a technical issue that it is difficult to facilitate the operator's work of evaluating the predictor. One object of the present invention is to provide a computer system which may ease the work of the operator when the operator evaluates the predictor.

Solution to Problem

A first aspect of the present invention relates to an evaluation system, including an input receiving unit to receive designation of an element constituting an evaluation index, and an evaluation-index calculation unit to calculate an evaluation-index value for a data set, wherein the data set is a set of sample data each of which includes a predicted value that is a value outputted by a predictor, and a observed value corresponding to the predicted value, the predictor is a function that takes a value of an explanation variable as input and outputs the predicted value, the evaluation-index value is a value indicating a result of evaluation on a degree of appropriateness of the predicted value which the predictor outputs for the value of the explanation variable inputted, the evaluation index is constituted by including, at least, an element belonging to a first type, an element belonging to a second type, and an element belonging to a third type, the element belonging to the first type is an element used when evaluating the sample data, the element belonging to the second type is an element used when weighting to the sample data, the element belonging to the third type is an element used when carrying out a statistical process to the plurality of sample data based on information outputted by the element belonging to the first type and information outputted by the element belonging to the second type, the input receiving unit receives designation of a specific element out of the elements belonging to the first type, designation of a specific element out of the elements belonging to the second type, and designation of a specific element out of the elements belonging to the third type, and the evaluation-index calculation unit calculates the evaluation-index value based on an evaluation index which is constituted by including the element received by the input receiving unit.

A second aspect of the present invention relates to an evaluation method, including receiving designation of an element which constitutes an evaluation index; and calculating an evaluation-index value for a data set, wherein the data set is a set of sample data each of which includes a predicted value that is a value outputted by a predictor, and a observed value that corresponds to the predicted value, the predictor is a function that takes a value of an explanation variable as input and outputs the predicted value, the evaluation-index value is a value of evaluation on a degree of appropriateness of the predicted value which the predictor outputs for the value of the explanation variable inputted, the evaluation index is constituted by including, at least, an element which belongs to a first type, an element which belongs to a second type, and an element which belongs to a third type, the element belonging to the first type is an element which is used when evaluating the sample data, the element belonging to the second type is an element which is used when weighting to the sample data, the element belonging to the third type is an element which is used when carrying out a statistical process to the plural sample data based on information outputted by the element belonging to the first type, and information outputted by the element belonging to the second type, when receiving the designation of the element constituting the evaluation index, designation of a specific element out of the elements belonging to the first type, designation of a specific element out of the elements belonging to the second type, and designation of a specific element out of the elements belonging to the third type are received, and when computing the evaluation-index value, the evaluation-index value is calculated based on an evaluation index that is constituted by including the element received.

A third aspect of the present invention relates to a program for causing a computer to execute a first process of receiving designation of an element which constitutes an evaluation index; and a second process of calculating an evaluation-index value for a data set, wherein the data set is a set of sample data each of which includes a predicted value that is a value outputted by a predictor, and a observed value that corresponds to the predicted value, the predictor is a function that takes a value of an explanation variable as input and outputs the predicted value, the evaluation-index value is a value of evaluation on a degree of appropriateness of the predicted value which the predictor outputs for the value of the explanation variable inputted, the evaluation index is constituted by including, at least, an element belonging to a first type, an element belonging to a second type, and an element belonging to a third type, the element belonging to the first type is an element used when evaluating the sample data, the element belonging to the second type is an element used when weighting to the sample data, the element, belonging to the third type, is an element used when carrying out a statistical process to the plural sample databased on information outputted by the element belonging to the first type, and information outputted by the element belonging to the second type, in the first process, receiving designation of a specific element out of the elements belonging to the first type, designation of a specific element out of the elements belonging to the second type, and designation of a specific element out of the elements belonging to the third type, and, in the second process, causes the computer to execute a process of computing the evaluation-index value based on an evaluation index that is constituted by including the element received in the first process.

A fourth aspect of the present invention relates to an evaluation system, including an input receiving unit to receive designation of an element which constitutes an evaluation index; and an evaluation module generation unit to generate an evaluation module, wherein the evaluation module is a module that calculates an evaluation-index value by carrying out an operation, which is defined by the evaluation index, to a data set, the data set is a set of sample data each of which includes a predicted value that is a value outputted by a predictor, and a observed value that corresponds to the predicted value, wherein the predictor is a function that takes a value of an explanation variable as input and outputs the predicted value, the evaluation-index value is a value indicating a result of evaluation on a degree of appropriateness of the predicted value which the predictor outputs for the value of the explanation variable inputted, the evaluation index is constituted by including, at least, an element which belongs to a first type, an element which belongs to a second type, and an element which belongs to a third type, the element belonging to the first type is an element used when evaluating the sample data, the element belonging to the second type is an element used when weighting to the sample data, the element belonging to the third type is an element used when carrying out a statistical process to the plural sample data based on information outputted by the element belonging to the first type and information outputted by the element belonging to the second type, the input receiving unit receives designation of a specific element out of the elements belonging to the first type, designation of a specific element out of the elements belonging to the second type, and designation of a specific element out of the elements belonging to the third type, and the evaluation module generation unit generates an evaluation module that carries out an operation defined by an evaluation index that is constituted by including the element received by the input receiving unit to the data set.

A fifth aspect of the present invention relates to a program for causing a computer to execute a first process of receiving designation of an element which constitutes an evaluation index; and a second process of generating an evaluation module, wherein the evaluation module is a module which calculates an evaluation-index value by carrying out an operation, that is defined by the evaluation index, to a data set, wherein the data set is a set of sample data each of which includes a predicted value that is a value outputted by a predictor, and a observed value that corresponds to the predicted value, the predictor is a function that takes a value of an explanation variable as input and outputs the predicted value, the evaluation-index value is a value indicating a result of evaluation on a degree of appropriateness of the predicted value which the predictor outputs for the value of the explanation variable inputted, the evaluation index is constituted by including, at least, an element belonging to a first type, an element belonging to a second type, and an element belonging to a third type, the element belonging to the first type is an element which is used when evaluating the sample data, the element belonging to the second type is an element which is used when weighting to the sample data, the element belonging to the third type is an element which is used when carrying out a statistical process to the plural sample data based on information outputted by the element belonging to the first type, and information outputted by the element belonging to the second type, in the first process, receiving designation of a specific element out of the elements belonging to the first type, designation of a specific element out of the elements belonging to the second type, and designation of a specific element out of the elements belonging to the third type, and, in the second process, causes the computer to execute a process of generating an evaluation module carrying out an operation defined by an evaluation index that is constituted by including the element received in the first process to the data set.

A sixth aspect of the present invention relates to a computer-readable storage medium storing a program for causing a computer to execute a first process of receiving designation of an element which constitutes an evaluation index; and a second process of generating an evaluation module, wherein the evaluation module is a module which calculates an evaluation-index value by carrying out an operation, that is defined by the evaluation index, to a data set, wherein the data set is a set of sample data each of which includes a predicted value that is a value outputted by a predictor, and a observed value that corresponds to the predicted value, wherein the predictor is a function that takes a value of an explanation variable as input and outputs the predicted value, wherein the evaluation-index value is a value indicating a result of evaluation on a degree of appropriateness of the predicted value which the predictor outputs for the value of the explanation variable inputted, wherein the evaluation index is constituted by including, at least, an element belonging to a first type, an element belonging to a second type, and an element belonging to a third type, wherein the element belonging to the first type is an element used when evaluating the sample data, wherein the element belonging to the second type is an element used when weighting to the sample data, wherein the element, belonging to the third type, is an element used when carrying out a statistical process to the plural sample data based on information outputted by the element belonging to the first type, and information outputted by the element belonging to the second type, in the first process, receiving designation of a specific element out of the elements belonging to the first type, designation of a specific element out of the elements belonging to the second type, and designation of a specific element out of the elements belonging to the third type, and, in the second process, causes the computer to execute a process of generating an evaluation module carrying out an operation defined by an evaluation index that is constituted by including the element received in the first process to the data set.

The object of the present invention can also be achieved by a computer-readable storage medium storing the above-mentioned program.

Advantageous Effects of Invention

The present invention produces a technically advantageous effect of enabling the provision of a computer system that facilitates the operator's work of evaluating the predictor by virtue of the above-mentioned technical means.

BRIEF DESCRIPTION OF DRAWINGS

FIG. 2 is a diagram illustrating an example of a data set according to the first exemplary embodiment of the present invention.

FIG. 3 is a diagram illustrating an example of information which is stored by a storage unit 110 according to the first exemplary embodiment of the present invention.

DESCRIPTION OF EMBODIMENTS

<Definition of Terminology>

Figure 1:
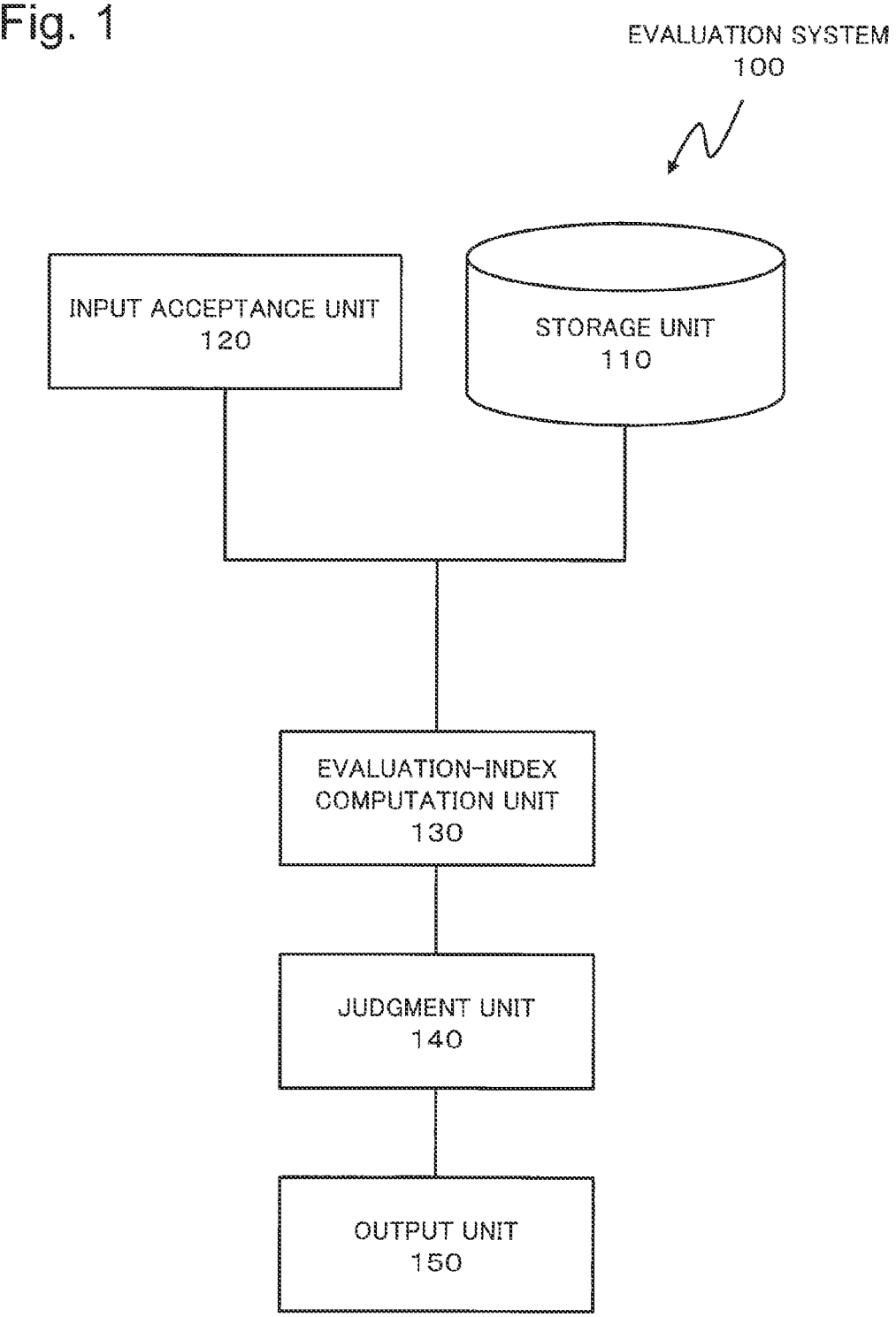
FIG. 1 is a block diagram illustrating a configuration of an evaluation system 100 according to a first exemplary embodiment of the present invention.

For easy understanding, the following terminologies are defined.

Predictor: A predictor is a function which takes a value of an explanation variable as input and outputs a predicted result.

Evaluation of predictor: Evaluation of the predictor is evaluation on the degree of appropriateness of the predicted result which the predictor outputs for the value of the inputted explanation variable.

Data set: A data set is a set of sample data. The sample data is information in which a predicted value, a observed value which corresponds to the predicted value, and ID (identifier) identifying the sample data are associated each other. The predicted value included in the sample data is the predicted result which the predictor outputted. In the case that the sample data is a set of a predicted value and a observed value of the highest temperature of one day, for example, the data set is a set of the sample data which are accumulated for one year, for example. For easy understanding, it is assumed in the following explanation that there is one-to-one correspondence between the data set and the predictor. However, correspondence between the data set and the predictor is not limited to the one-to-one correspondence.

(Evaluation-index value): An evaluation-index value is a value indicating a result of evaluating an appropriateness of the predicted value which the predictor outputs for the value of the inputted explanation variable. For example, the evaluation-index value is a statistical value of a difference between the predicted value and the observed value which corresponds to the predicted values respectively. In the following explanation, it is assumed that the predictor obtains low ratings as the evaluation-index value increases. However, a relation between a degree of largeness of the evaluation-index value and a rating of evaluation on the predictor is not limited to the above-mentioned relation.

(Evaluation index): An evaluation index defines an operation which takes the data set as input and outputs the evaluation-index value.

(Evaluation module): An evaluation module is a module used for the purpose of evaluating the predictor. The evaluation module carries out the operation, which is defined by the evaluation index, to the data set. The evaluation module outputs the evaluation-index value as a result of the operation.

The aforementioned are the definition of the terminologies.

<Explanation on a Reason that a Procedure for Evaluating the Predictor is Complicated>

A reason that a procedure for evaluating the predictor is complicated will be explained in the following. Here, the following description is based on knowledge of the present inventor.

The reason that a procedure for evaluating the predictor is complicated is that there are many kinds of the evaluation indexes each of which is an index for evaluating the predictor. It is necessary for an evaluator who evaluates the predictor to generate the evaluation module for each of the many kinds of evaluation indexes. A procedure for generating each of the plural evaluation modules is very complicated. Furthermore, the evaluator must evaluate the predictor by using each of the evaluation modules.

The reason that a procedure for evaluating the predictor is complicated will hereinafter be explained in further detail.

In the case that knowledge acquired by data mining is utilized in business, for example, prediction subjects of data mining exist in various fields according to a sort of the business. Moreover, it is necessary to evaluate the predictor by using the evaluation index which is generated with taking a peculiar situation of the business into consideration. Specific examples of a proprietor of a supermarket which sells fresh foods, and a business operator who resells reused golf clubs will be explained in the following.

Firstly, suppose the case of the proprietor of the supermarket which sells the fresh foods. The proprietor tries to predict number of tomatoes, which will be sold on the next day, by use of a data mining system. The data mining system inputs past sales of tomato, weather of the next day and the like into the predictor as the value of the explanation variable. Then, the predictor outputs the predicted result, that is, the predicted value. The data mining system outputs the value, which is outputted by the predictor, as the predicted result which indicates the number of tomatoes which will be sold on the next day.

It is not unusual that the sales of fresh foods vary significantly at a short period of time since the sales is influenced by the best season of the fresh food.

When considering the above-mentioned characteristic circumstances to the sales of fresh foods, it is appropriate, for example, that the predictor which predicts the number of tomatoes to be sold on the next day are evaluated based on the latest sample data. For example, it is appropriate that the predictor is evaluated based on the sample data accumulated for the latest one month, Next, suppose the case of the business operator who resells the used golf clubs. The business operator tries to predict a market value of a used golf club, which exists in front of the business operator, by use of the data mining system. According to the data mining system, for example, a manufacturer of the used golf club, existence of a scratch, a material, a sales year or the like is inputted into the predictor as the value of the explanation variable. Then, the predictor outputs the predicted result, that is, the predicted value. The data mining system outputs the value which is outputted by the predictor as the predicted result of a market price.

In the case of the used golf club, it is not unusual that the predicted value, which is predicted based on the manufacturer of the used golf club, existence of the scratch, the material, the sales year or the like, and the actual market price (observed value) are diverging significantly with each other. For example, it is anticipated that, for example, a used golf club with a signature of a famous player, a used golf club which a famous player has used, or the like circulates in the market at a quite high price.

When considering the above-mentioned characteristic circumstances to the used golf club, it is appropriate, for example, that the predictor which predicts the market price of the used golf club is evaluated with excluding influence of the sample data whose predicted value and the observed value are extremely different each other. For example, it is appropriate that the predictor are evaluated with neglecting top 5%, whose predicted value and the observed value are largely different each other, out of a plurality of sample data. Moreover, it is appropriate that the predictor are evaluated based on a median which is not apt to receive influence of an outlier, As mentioned above, it is desirable that the predictor is evaluated by the various kinds of evaluation indices which are generated with taking characteristic circumstances of the business into consideration. Accordingly, the kinds of the evaluation indices become vast, and the procedure for generating the evaluation module for each evaluation index is complicated.

An exemplary embodiment of the present invention which can solve the above-mentioned problem will be explained in detail with reference to drawings.

<First Exemplary Embodiment>

(Explanation of Outline)

The present inventor conceives the idea of constituting the evaluation index, which is an index used when evaluating the predictor, as a combination of a plurality of elements. Constituting the evaluation index as a combination of the plurality of elements enables to reuse the element. That is, once the element is defined, it is possible to reuse (in other words, to use plural times) the element in the plural evaluation indexes. Accordingly, man-hours for generating the evaluation module per the evaluation index can be reduced.

The present inventor conceives the idea of constituting the evaluation index is by combining three types of elements described in the following. If the evaluation index is constituted by a combination of three types of elements described in the following, there are many cases that each element can be used in the plural evaluation indexes. This knowledge is a rule of thumb which the present inventor has detected.

Three types of elements are, namely, an element which belongs to a type denoted as LOSS, an element which belongs to a type denoted as SAMPLING, and an element which belongs to a type denoted as STATISTIC. There is a case hereinafter that 'element which belongs to the type denoted as LOSS' is abbreviated as 'LOSS'. Moreover, there is a case that 'element which belongs to the type denoted as SAMPLING' is abbreviated as 'SAMPLING'. Furthermore, there is a case that 'element which belongs to the type denoted as STATISTIC' is abbreviated as 'STATISTIC'.

LOSS is an element which evaluates one sample data. A typical example of LOSS is an element which calculates the above-mentioned difference between the predicted value and the observed value.

SAMPLING is an element which applies weights to the sample data.

STATISTIC is an element which carries out a statistical processing to the plural sample data based on information outputted by the above-mentioned LOSS, and information outputted by the above-mentioned SAMPLING.

Since the evaluation indices are constituted by a combination of the above-mentioned three types of elements, it is possible to reuse each element in the various evaluation indices. Therefore, the procedure of generating the evaluation module, which carries out the operation defined by each evaluation index, becomes facilitated.

(Detailed Explanation)

FIG. 1 is a block diagram explaining a configuration of an evaluation system according to a first exemplary embodiment.

As illustrated in FIG. 1, an evaluation system 100 includes a storage unit 110, an input receiving unit 120, an evaluation-index calculation unit 130, a determination unit 140 and an output unit 150. The storage unit 110 stores a plurality of elements which constitute an evaluation index. The input receiving unit 120 receives an input of information which designates the element. The evaluation-index calculation unit 130 receives an input of a data set. The evaluation-index calculation unit 130 carries out a calculation defined by an evaluation index to the data set. The evaluation index calculation unit 130 calculates an evaluation-index value by the aforementioned calculation. Based on the evaluation-index value, the determination unit 140 determines the quality of the predictor corresponding to the data set is acceptable or not. The output unit 150 outputs the determination result as to whether the quality of the predictor is acceptable or not and the evaluation-index value in association with each other.

Next, the data set will be described. FIG. 2 is a diagram explaining an example of the data set. In a data set conceptually exemplified as a table in FIG. 2, information indicated in each row of the table corresponds to the sample data. As illustrated in FIG. 2, the sample data is information which associates a predicted value, a observed value which corresponds to the predicted value and ID identifying the sample data with each other. According to the example illustrated FIG. 2, ID identifying the sample data is data which indicates a date. According to the example illustrated FIG. 2, the predicted value is the predicted highest temperature at the date. According to the example illustrated FIG. 2, the observed value is the measured highest temperature at that date. As illustrated in FIG. 2, the data set is a set of the sample data. The predicted value illustrated in FIG. 2 is a predicted value which one predictor predicts. In the following explanation, for easy understanding, it is assumed that the data set and the predictor have the one to one relation unless otherwise noted.

Moreover, different information other than the predicted value, the observed value, and ID identifying the sample data may be associated with the sample data. For example, when the predictor is generated from the data set, information indicating whether the sample data is test data or training data may be associated with the sample data.

FIG. 3 is a diagram illustrating an example of information which the storage unit 110 stores. Information illustrated in each row of FIG. 3 corresponds to one element. The storage unit 110 stores LOSS (corresponding to ID=1 to ID=3 in FIG. 3), SAMPLING (corresponding to ID=4 to ID=8 in FIG. 3) and STATISTIC (corresponding to ID=9 to ID=11 in FIG. 3). As described above, each element which belongs to LOSS, SAMPLING or STATISTIC is an element which constitutes the evaluation index. In the example illustrated in FIG. 3, the storage unit 110 further stores elements (corresponding to ID=12 to ID=13 in FIG. 3) which belong to a type denoted as SUMMARY. The element which belongs to the type denoted as SUMMARY will be described later.

Each element is a function which takes the data set or the sample data as input. The storage unit 110 stores information identifying the element, and an operation defined by the element in association with each other. According to the example illustrated in FIG. 3, the information which identifies the element is 'ID' illustrated in a first column or 'name of element' illustrated in a third column. The operation defined by the element cannot be described in FIG. 3 because of limitation of space of a sheet. Accordingly, the operation will be explained in the description as follows.

The elements which correspond to ID=1 to ID=11 exemplified in FIG. 3 will hereinafter be explained in detail. The 11 types of the elements described in the following are exemplified as a mere specific example. The following explanation are not intended to limit interpretation of the element stored in the storage unit 110.

The element having ID=1 in FIG. 3, that is, 'AbsoluteError' will be described in the following. As illustrated in FIG. 3, 'AbsoluteError' is LOSS. 'AbsoluteError' is a function of computing absolute value of the difference between the predicted value and the observed value for each of the sample data.

The element having ID=2 in FIG. 3, that is, 'AbnormalValue' will be described in the following. As illustrated in FIG. 3, 'AbnormalValue' is LOSS. For each of the sample data, 'AbnormalValue' determines whether the predicted value of the sample data is an abnormal value or not. 'AbnormalValue' outputs 1 in the case that the predicted value is the abnormal value, and outputs 0 elsewhere.

An operator inputs a range (that is, at least, any one of an upper-limit value or a lower-limit value), in which the predicted value can take, as a parameter. 'AbnormalValue' carries out the judgment by comparing the inputted range and the predicted value of the sample data.

For example, suppose a case next day's sales of tomato in a supermarket is predicted. At this time, a value of the sales of tomato is positive. In this case, the operator inputs the range of '0 or larger than 0' as the parameter. 'AbnormalValue' outputs 1 for the sample data if the predicted value of the sample data is 0 or larger than 0, and outputs 0 for the sample data if the predicted value of the sample data is smaller than 0.

The element having ID=3 in FIG. 3, that is, 'SquaredError' will be described in the following. As illustrated in FIG. 3, 'SquaredError' is LOSS. 'SquaredError' is a function which calculates a square of the difference between the predicted value and the measure value for each of the sample data.

The element having ID=4 in FIG. 3, that is, 'All' will be described in the following. As illustrated in FIG. 3, 'All' is SAMPLING. 'All' is a function which applies a weight of 1 to all of the sample data.

The element having ID=5 in FIG. 3, that is, 'Train' will be described in the following. As illustrated in FIG. 3, 'Train' is SAMPLING. 'Train' is a function which, in a case that one sample data is a training data, applies a weight of 1 to the sample data. Moreover, 'Train' is a function which applies a weight of 0 to the sample data which is not the training data.

The element having ID=6 in FIG. 3, that is, 'Test' will be described in the following. As illustrated in FIG. 3, 'Test' is SAMPLING. 'Test' is a function which, in case that one sample data is a test data, applies a weight of 1 to the sample data. Moreover, 'Train' is a function which applies a weight of 0 to the sample data which is not the test data.

The element having ID=7 in FIG. 3, that is, 'Range' will be described in the following. As illustrated in FIG. 3, 'Range' is SAMPLING. 'Range' is a function which applies a weight of 1 to the sample data that exists within a range designated by the operator, that is, in a range from a designated starting ID to a designated ending ID.

The element having ID=8 in FIG. 3, that is, 'Custom' will be described in the following. As illustrated in FIG. 3, 'Custom' is SAMPLING. 'Custom' is a function which applies weights to the sample data based on a weight designation file designated by the operator.

The element having ID=9 in FIG. 3, that is, 'Median' will be described in the following. As illustrated in FIG. 3, 'Median' is STATISTIC. 'Median' is a function which outputs a median out of the values outputted by LOSS for the sample data which has weights larger than 0.

The element having ID=10 in FIG. 3, that is, 'Lower-Mean' will be described in the following. As illustrated in FIG. 3, 'Lowermean' is STATISTIC. 'LowerMean' is a function which arranges the values, that LOSS outputs for the sample data which has weights larger than 0, in descending order, and calculates a mean of the values outputted by LOSS for only sample data which correspond to the value, outputted by LOSS, at the bottom $\alpha$ positions or the bottom $\alpha$ % positions in the order.

The element having ID=11 in FIG. 3, that is, 'Upper-Mean' will be described in the following. As illustrated in FIG. 3, 'Uppermean' is STATISTIC. 'UpperMean' is a function which arranges the values, that LOSS outputs for the sample data having weights larger than 0, in descending order, and calculates a mean of the values outputted by LOSS for only sample data which correspond to the value, outputted by LOSS, at the top a positions or at the top $\alpha$ % positions in the order.

As mentioned before, the elements which correspond ID=1 to ID=11 exemplified in FIG. 3 and have been described.

Next, specific examples of the evaluation index will be described. As mentioned above, the evaluation index is constituted by a combination of three types of the elements of LOSS, SAMPLING and STATISTIC. However, it is not always necessary that all of the evaluation indices include the above-mentioned combination of the three types of the elements. Alternatively, an evaluation index may be constituted so as to further include an element different from the three types of the elements in addition to the three types of the elements.

Some specific examples of the evaluation index will be described in the following. In addition, a combination of the elements which constitutes the evaluation index will be described. Each of the examples described in the following is a mere specific example for ease of understanding, and the example are not intended for limited interpretation of the evaluation index.

As a first specific example of the evaluation index, 'Bottom 95% error rate' will be described in the following. 'Bottom 95% error rate' is acquired by calculating an error value (for example, a value of 'AbsoluteError' or 'Squared-Error') for each of the sample data, removing the top 5% of the sample data having largest error values out of all the sample data, and calculating the mean of the error value of the bottom 95% of the sample data. Accordingly, 'Bottom 95% error rate' is constituted by a combination of the following elements.

LOSS: AbsoluteError,
SAMPLING: All, and
STATISTIC: LowerMean (0.95)

As a second specific example of the evaluation index, 'Abnormal value appearance number ratio' will be described in the following. 'Abnormal value appearance number ratio' is acquired by carrying out a judgment whether each of the sample data is an abnormal value or not, and calculating a ratio of number of the sample data judged to be the abnormal value against the total number of the sample data. Accordingly, 'Abnormal value appearance number ratio' is constituted by a combination of the following elements.

LOSS: AbnormalValue (0, infinity),
SAMPLING: All, and
STATISTIC: Percentage

As a third specific example of the evaluation index, 'Median of absolute error' will be described in the following. 'Median of absolute error' is acquired by calculating an absolute error for each of the plurality of sample data, and calculating a median of the absolute values for all of the sample data. Accordingly, 'Median of absolute error' is constituted by a combination of the following elements.

LOSS: AbsoluteError,
SAMPLING: All, and
STATISTIC: Median

As a fourth specific example of the evaluation index, 'Last one month error rate' will be described in the following. 'Last one month error rate' is acquired by calculating a mean value of the absolute errors of the sample data accumulated for the last one month. Accordingly, 'Last one month error rate' is constituted by a combination of the following elements.

LOSS: AbsoluteError,
SAMPLING: Custom (LastOneMonth.csv), and
STATISTIC: Median

Here, 'LastOneMonth.csv' is a file designating the sample data accumulated for the last one month, out of the data set associated with the predictor which tries to carry out evaluation by use of the last one month error rate.

The above-mentioned specific examples are provided to facilitate understanding.

Returning to the explanation which refers to FIG. 1. The input receiving unit 120 accepts the input of information which designates the element. An example of a format representing information which the input receiving unit 120 receives will be described in the following. The operator of the evaluation system 100 inputs the information having a format as illustrated in the following into the input receiving unit 120.

Label, LOSS (param), SAMPLING (param), STATISTIC (param)

Label in the above-mentioned format indicates a name of the evaluation index. The operator determines the name of the evaluation index at his discretion. LOSS in the above-mentioned format indicates information (hereinafter described as 'LOSS designation information') which designates an element belonging to the type of LOSS. In the case that the designated element which requires a parameter (param), it is necessary for the operator to also designate the parameter. Similarly, STATISTIC in the above-mentioned format indicates information (hereinafter described as 'STA- TISTIC designation information') which designates an element belonging to the type of STATISTIC. SAMPLING in the above-mentioned format indicates information (hereinafter described as 'SAMPLING designation information') which designates an element belonging to the type of SAMPLING. The information which designates the element is, for example, 'ID' or 'Name of element' which are illustrated in FIG. 3

Suppose a case where the operator tries to generate a module which calculates a value of the bottom 95% error rate by using a name of Label_1. In this case, the operator inputs information as described in the following, for example, into the input receiving unit 120.

Label_1, AbsoluteError, ALL, LowerMean (0.95)

Suppose another case where the operator tries to generate a module which calculates a value of the last one month error rate by using a name of Label_2. In this case, the operator inputs information shown in the following, for example, into the input receiving unit 120.

Label_2, AbsoluteError, Custom (LastOneMonth.csv), LowerMean (1)

Upon accepting an input of the data set, the evaluation-index calculation unit 130 carries out the operation, which is defined by the evaluation index which the input receiving unit 120 accepts, to the data set. The evaluation-index calculation unit 130 calculates the evaluation-index value as a result of carrying out the operation.

Figure 4:
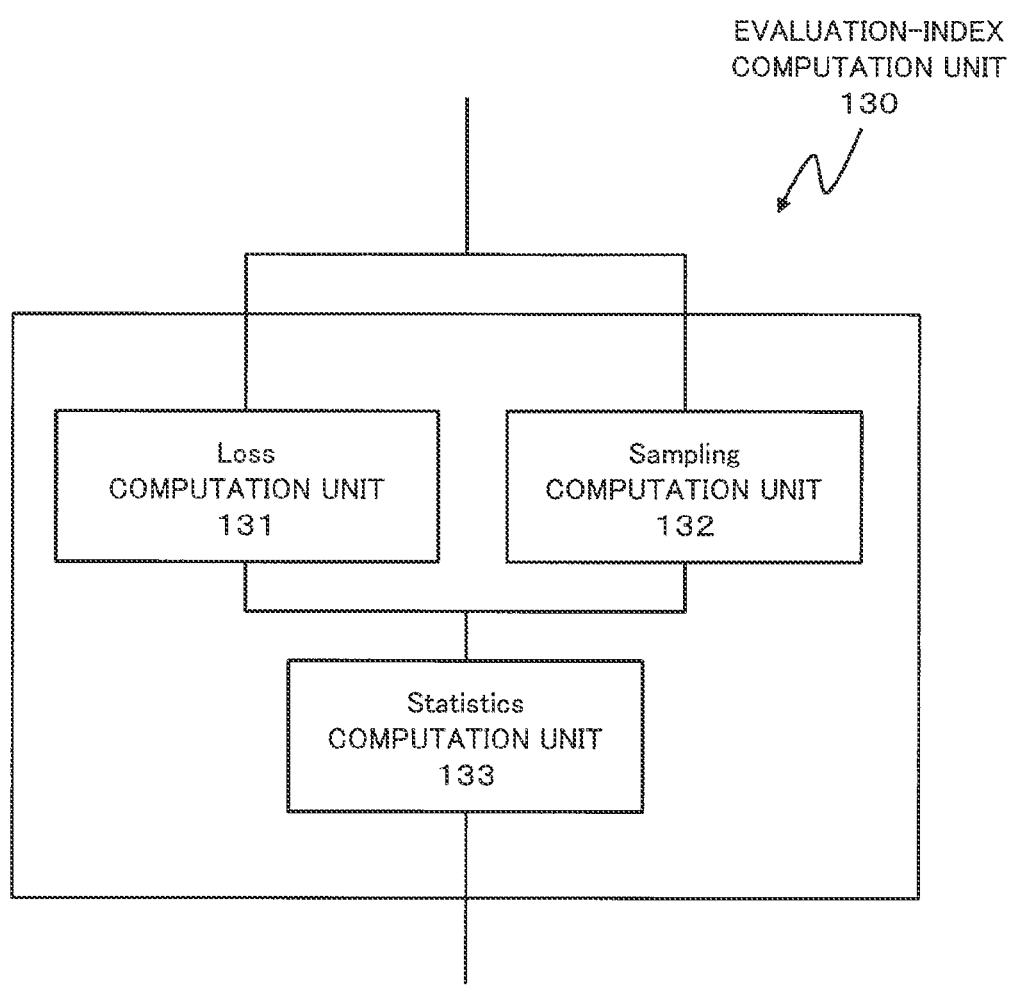
FIG. 4 is a block diagram illustrating a configuration of an evaluation-index calculation unit 130 according to the first exemplary embodiment of the present invention.

FIG. 4 is a block diagram illustrating a configuration of the evaluation-index calculation unit 130 illustrated in FIG. 1 in more detail. As illustrated in FIG. 4, the evaluation-index calculation unit 130 includes a LOSS calculation unit 131, a SAMPLING calculation unit 132 and a STATISTIC calculation unit 133.

The LOSS calculation unit 131 refers to the storage unit 110 based on information which the input receiving unit 120 receives and designating LOSS. The LOSS calculation unit 131 carries out an operation defined by the designated LOSS to each of the sample data included in the data set.

The SAMPLING calculation unit 132 refers to the storage unit 110 on the basis of information which the input receiving unit 120 accepts and which designates SAMPLING. The SAMPLING calculation unit 132 carries out an operation, which is defined by the designated SAMPLING, to each sample data which the data set includes.

The STATISTIC calculation unit 133 refers to the storage unit 110 on the basis of information which the input receiving unit 120 accepts and which designates STATISTIC. The STATISTIC calculation unit 133 carries out an operation, which is defined by the designated STATISTIC, to data which the LOSS calculation unit 131 outputs, and data which the SAMPLING calculation unit 132 outputs. The STATISTIC calculation unit 133 outputs the evaluation-index value which is a result of the operation.

As described above, the evaluation-index calculation unit 130 functions as the evaluation module which calculates the evaluation index.

It should be noted that receiving the output of the SAMPLING calculation unit 132 the LOSS computation unit 131 may carry out the operation defined by the designated LOSS only to specific sample data weighted by the SAMPLING calculation unit 132.

Returning to the explanation which refers to FIG. 1. The determination unit 140 determines quality of the predictor based on the evaluation-index value which the evaluation-index calculation unit 130 calculates. A predictor which is to be evaluated is the predictor corresponding to the data set received by the evaluation-index calculation unit 130. The determination unit 140 may store the correspondence between the data set and the predictor in advance. The correspondence between the data set and the predictor may be explicitly inputted by the operator.

The determination unit 140 determines quality of the predictor by comparing a threshold value and the evaluation-index value, for example. As a result of judging the quality of the predictor, the determination unit 140 outputs information which indicates whether quality of the predictor is acceptable or not. Moreover, the determination unit 140 may output a result of judging the quality of the predictor in a form of a score, a predetermined rank or the like.

The output unit 150 outputs the determination result on the quality of the predictor (whether the quality is acceptable or not) and the evaluation-index value in association with each other.

(An Example of Hardware Configuration of the Evaluation System 100)

Figure 5:
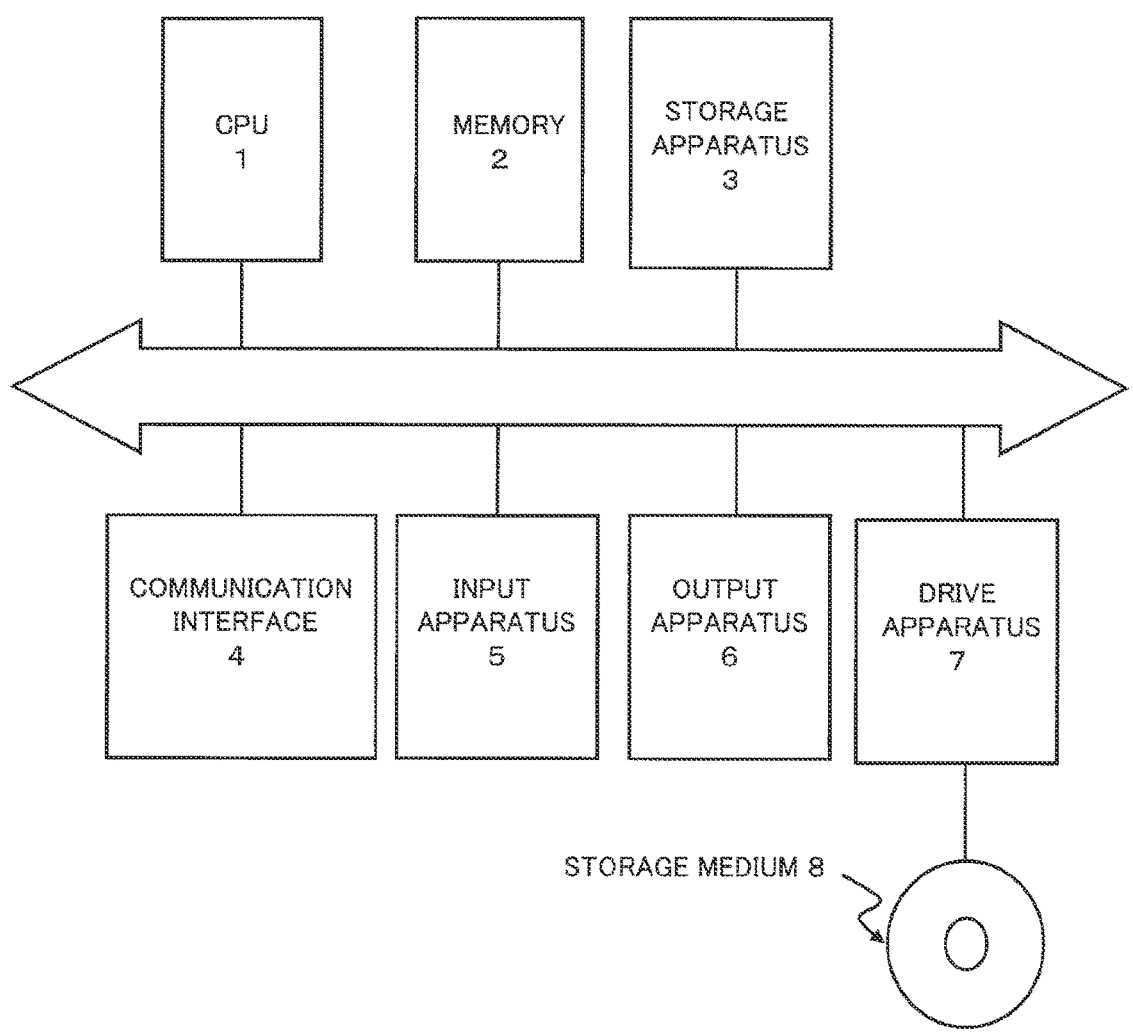
FIG. 5 is a diagram illustrating an example of a hardware configuration which realizes the evaluation system 100 according to the first exemplary embodiment of the present invention.

FIG. 5 is a diagram illustrating an example of a hardware configuration which realizes the evaluation system 100.

Hardware constituting the evaluation system 100 (computer) includes CPU (Central Processing Unit) 1, a memory 2, a storage apparatus 3, and a communication interface (I/F) 4. The evaluation system 100 may include an input apparatus 5 and an output apparatus 6. The function of the evaluation system 100 is realized, for example, by CPU 1's executing a computer program (software program: hereinafter merely described as 'program') which is read out from the memory 2. When executing the program, CPU 1 appropriately controls the communication interface 4, the input apparatus 5 and the output apparatus 6.

The present invention, which is described by exemplification of the present exemplary embodiment and exemplary embodiments which will be described later, may be constituted by a non-volatile storage medium 8 storing the program such as a compact disc or the like. The program stored by the storage medium 8 is read out by a drive apparatus 7, for example.

Communication which the evaluation system 100 carries out is realized, for example, by an application program's controlling the communication interface 4, for example, with using a function provided by OS (Operating System). The input apparatus 5 is a keyboard, a mouse or a touch panel, for example. The output apparatus 6 is a display, for example. The evaluation system 100 may be constituted by two or more physically-separated apparatuses which are connected through wired or wireless connection.

The example of the hardware configuration illustrated in FIG. 5 is applicable to each of the exemplary embodiments which will be described later. Here, the evaluation system 100 may be a dedicated apparatus. Furthermore, hardware configurations of the evaluation system 100 and each function block thereof are not limited to the above-mentioned configurations.

(Explanation on Operation of the Evaluation System 100)

Figure 6:
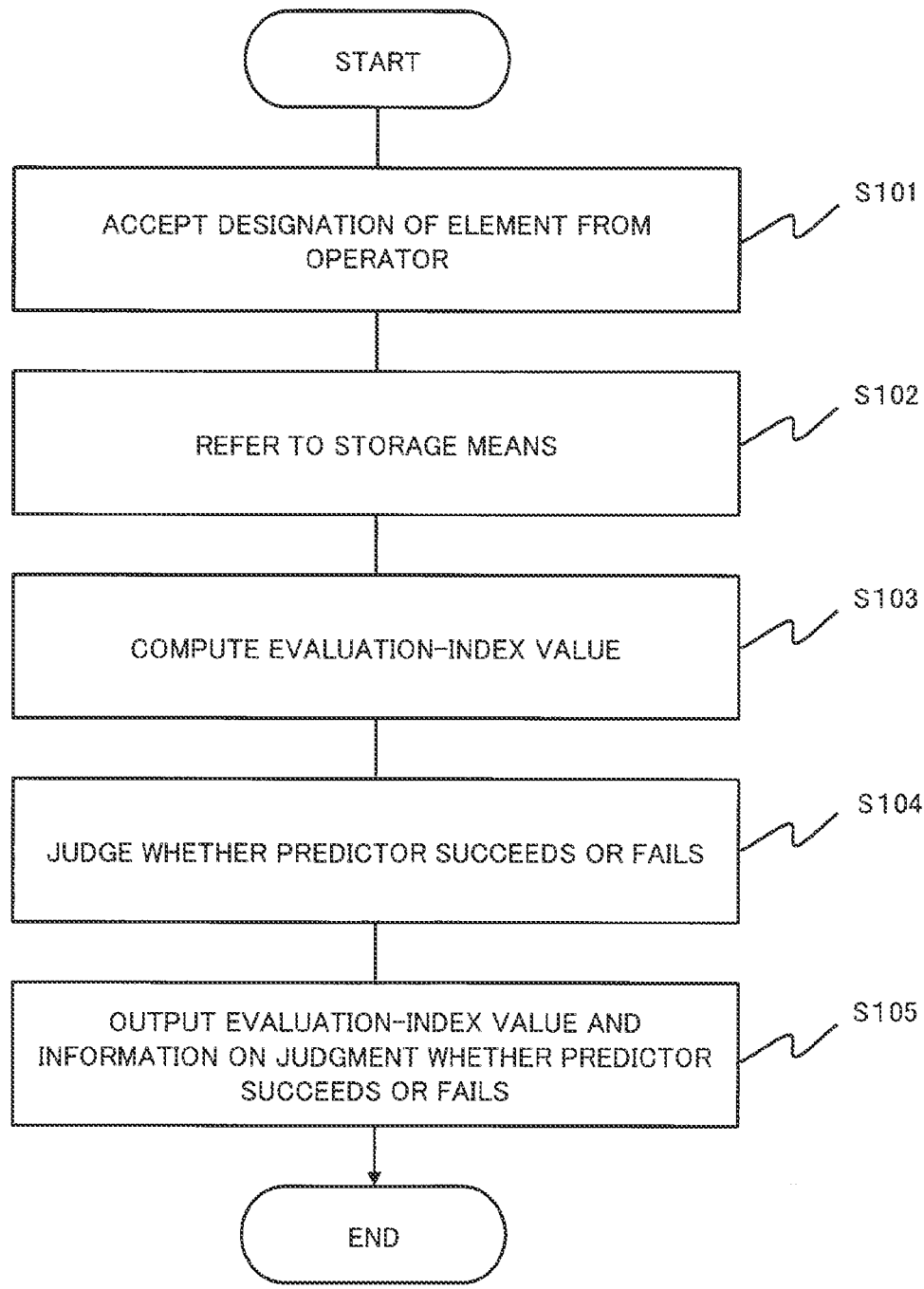
FIG. 6 is a diagram illustrating an example of an operation carried out by the evaluation system 100 according to the first exemplary embodiment of the present invention.

An example of an operation of the evaluation system 100 will be described in the following with reference to a flowchart illustrated in FIG. 6.

The input receiving unit 120 receives designation of the element (Step S101). The evaluation-index calculation unit 130 refers to the storage unit 110 on the basis of the element which the input receiving unit 120 receives (Step S102). The evaluation-index calculation unit 130 carries out the operation defined by the evaluation index to the data set. By carrying out the operation, the evaluation-index calculation unit 130 calculates the evaluation-index value (Step S103). The determination unit 140 determines the quality of the predictor based on the evaluation-index value (Step S104). The output unit 150 outputs the judgment result and the evaluation-index value (Step S105).

(Advantageous Effect which the First Exemplary Embodiment Achieves)

According to the evaluation module 100, it is possible to facilitate the procedure of evaluating the predictor. The reason will be explained by use of a specific example.

For example, suppose the case that the operator carries out the following procedure. That is, firstly, the operator evaluates a first predictor, which corresponds to a first data set, by using the evaluation index of 'Bottom 95% error rate'. Next, the operator evaluates a second predictor, which corresponds to a second data set, by using the evaluation index of 'Last one month error rate'

In the case that the operator does not use the evaluation system 100, the operator needs to individually generate both of an evaluation module which calculates 'Bottom 95% error rate', and an evaluation module which calculates 'Last one month error rate'. Then, by use of each evaluation module, the operator calculates the respective evaluation-index value. The above-mentioned procedure is complicated for the operator.

On the other hand, in the case that the operator uses the evaluation system 100, the operator inputs the information designating the element constituting the evaluation index into the input receiving unit 120. From an operator's side, it can be seen that the evaluation-index calculation unit 130 functions as the desired evaluation module only by carrying out the procedure of inputting the information. Therefore, according to the evaluation system 100, it is possible to facilitate the procedure of evaluating the predictor.

Moreover, for example, both of LOSS constituting 'Bottom 95% error rate', and LOSS constituting 'Last one month error rate' are 'AbsoluteError' as mentioned above, and are as a consequence common function. Moreover, both of STATISTIC constituting 'Bottom 95% error rate', and STATISTIC constituting 'Last one month error rate' are 'LowerMean' and are common function consequently. Through constituting the evaluation index by use of a combination of three types of the elements of LOSS, SAMPLING and STATISTIC, a case in which each element can be reused increases. This is a rule of thumb which the present inventor has newly detected. According to the evaluation system 100, since each element can be reused, it is possible to facilitate the procedure of evaluating the predictor.

<Second Exemplary Embodiment>

Figure 7:
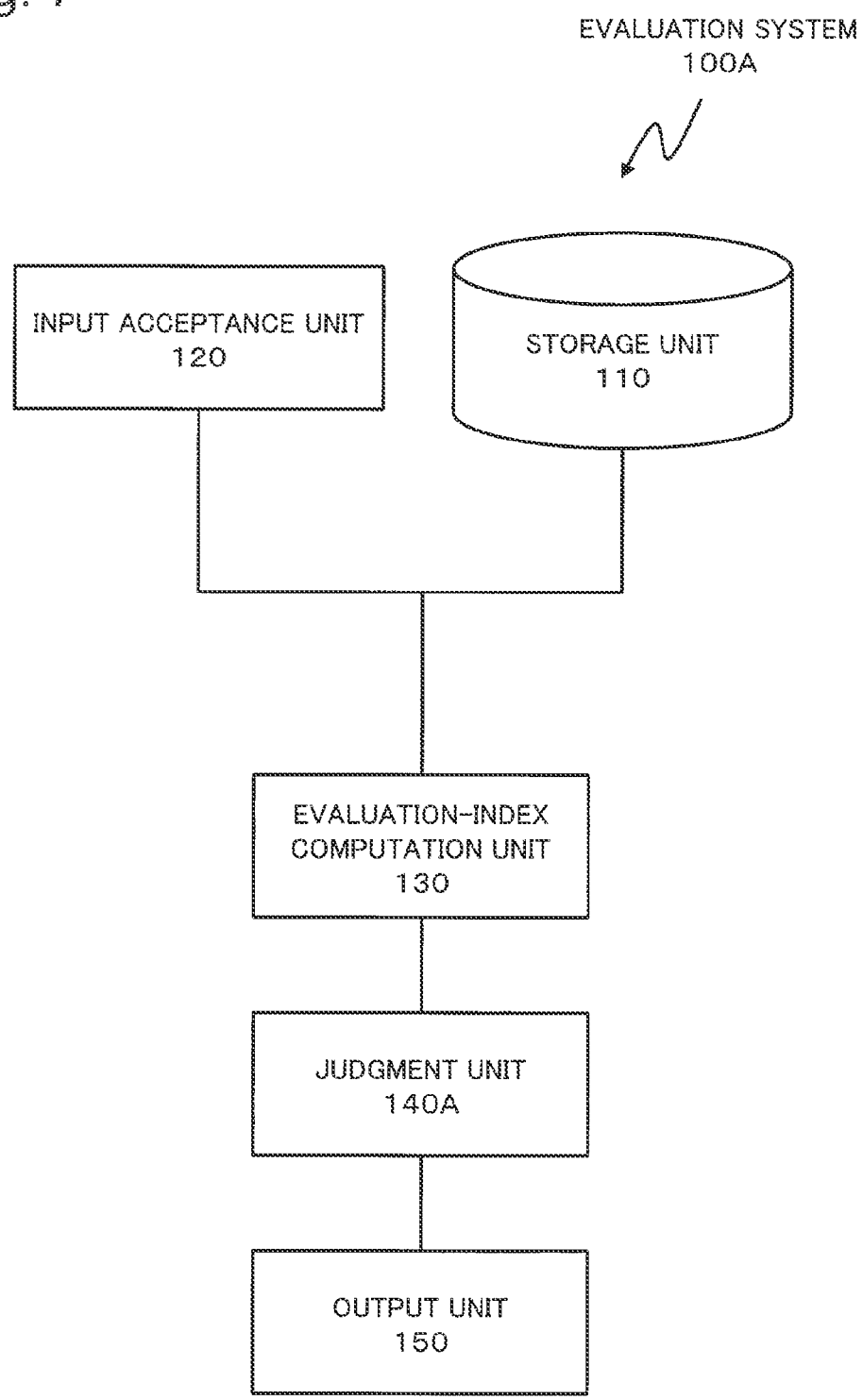
FIG. 7 is a block diagram illustrating a configuration of an evaluation system 100A according to a second exemplary embodiment of the present invention.

Next, a second exemplary embodiment, which is based on the first exemplary embodiment described above, will be described. FIG. 7 is a block diagram illustrating a configuration of an evaluation system 100A according to the second exemplary embodiment. The same reference sign is assigned to a component which is substantially identical to the component illustrated FIG. 1, and explanation on the identical component is omitted. The evaluation system 100A illustrated in FIG. 7 includes a determination unit 140A in place of the determination unit 140.

(Explanation of Outline)

Consider the case where the predicted result which the predictor outputs is utilized for a business. In this case, according to the knowledge which the present inventor has detected, it is desirable to evaluate the predictor from a plural point of view which are different each other. The evaluation system 100A according to the second exemplary embodiment evaluates one predictor from different points of view.

(Detailed Explanation)

Here, an element, which belongs to a type denoted as SUMMARY illustrated in FIG. 3, will be described. 'Element which belongs to the type denoted as SUMMARY' is hereinafter abbreviated as 'SUMMARY' in some cases. SUMMARY is a function of combining a plurality of the evaluation indices each of which is constituted by combining LOSS, SAMPLING and STATISTIC as described in the first exemplary embodiment.

An element of 'AndALL' (ID=12) and an element of 'Wsum' (ID=13) are illustrated in FIG. 3, as specific examples of the element which belong to the type denoted as SUMMARY. Each of 'AndALL' and 'Wsum' is a mere specific example of SUMMARY, and the explanation are not intended to limit interpretation of SUMMARY.

Firstly, 'AndAll' will be described. 'AndAll' is a function which determines whether each of the plural evaluation indexes satisfies a criterion or not.

In the case that an operator tries to evaluate the predictor by use of 'AndAll', the operator inputs the following information into the input receiving unit 120, for example.

Label_4, AndAll (Label_1, Label_2, Label_3,3, 0, 2),
Label_1, AbsoluteError, ALL, LowerMean (0.95),
Label_2, AbnormalValue (0, infinity), Percentage,
Label_3, AbsoluteError, Custom (LastOneMonth.csv), LowerMean(1)

'AndAll' (Label_4) constituted by the above-mentioned information outputs a value of 1 for one predictor when a value of 'Bottom 95% error rate (Label_1) is smaller than 3, and a value of 'Abnormal value appearance number rate (Label_2) is equal to 0 or smaller than 0, and a value of 'Last one month error rate (Label_3) is smaller than 2. Accordingly, it is possible to evaluate the predictor from three points of view which are different each other, that is, the bottom 95% error rate, the abnormal value appearance number ratio and the last one month error rate.

An example of an operation of the evaluation system 100A in the case when the input receiving unit 120 receives 'AndAll' will be explained briefly.

The input receiving unit 120 receives the above-mentioned information.

The evaluation-index calculation unit 130 calculates a value of 'Bottom 95% error rate' for the inputted data set. The evaluation-index calculation unit 130 also calculates a value of 'Abnormal value appearance number ratio' for the data set. The evaluation-index calculation unit 130 also calculates a value of 'Last one month error rate' for the data set.

The determination unit 140A receives the value of bottom 95% error rate, the value of abnormal value appearance number ratio and the value of last one month error rate from the evaluation-index calculation unit 130. The determination unit 140A refers to an operation defined by 'AndAll' by referring to the storage unit 110. Moreover, the determination unit 140A acquires a reference value which the input receiving unit 120 accepts. The reference value for the value of bottom 95% error rate, the value of abnormal value appearance number ratio and the value of last one month error rate are 3, 0 and 2 respectively. The determination unit 140A determines whether the value of each evaluation index satisfies the respective criterion or not.

In the case that each of the values of the evaluation indexes satisfies the respective reference, the determination unit 140A outputs a judgment result that the quality of the predictor is acceptable. On the other hand, in the case that at least one evaluation index does not satisfy the corresponding criterion, the determination unit 140A outputs a judgment result that quality of the predictor is not acceptable.

The aforementioned are an explanation of 'AndAll' which is the example of SUMMARY.

Next, 'Wsum' which is an example of SUMMARY will be described. 'Wsum' is a function which calculates the evaluation-index values for one predictor from a plural points of view, and calculates a weighted mean of the plural evaluation-index values. In the case that the operator tries to evaluate the predictor by use of 'Wsum', the operator inputs information described in the following into the input receiving unit 120, for example.

Label_3, Wsum (Label_1, Label_2, 2, 1),
Label_1, AbsoluteError, ALL, LowerMean (0.95),
Label_2, AbsoluteError, Custom (Label_2.csv), LowerMean (1)

'Wsum' (Label_3), which is constituted by the above-mentioned information, calculates a value of 'Bottom 95% error rate' (Label_1) and a value of 'Last one month error rate' (Label_2), and calculates a weighted mean value of the value of 'Bottom 95% error rate' having a weight of 2, and the value of 'Last one month error rate' having a weight of 1. Accordingly, it is possible to evaluate the predictor from two points of view which are different each other, that is, from the points of view of the bottom 95% error rate and the last one month error rate.

An example of an operation of the evaluation system 100A which is carried out in the case when the input receiving unit 120 accepts 'Wsum' will be described.

The input receiving unit 120 accepts the above-mentioned information.

The evaluation-index calculation unit 130 calculates a value of 'Bottom 95% error rate' for the inputted data set. The evaluation-index calculation unit 130 also calculates a value of 'Last one month error rate' for the data set.

The determination unit 140A receives the value of bottom 95% error rate and the value of last one month error rate from the evaluation-index calculation unit 130. The determination unit 140A refers to an operation defined by 'Wsum', by referring to the storage unit 110. Moreover, the determination unit 140A acquires values indicating weights which the input receiving unit 120 receives. In the above-mentioned example, a value of the weight assigned to the value of bottom 95% error rate is 2, and a value of the weight assigned to the value of abnormal value appearance number ratio is 1.

The determination unit 140A calculates a weighted mean value of the value of bottom 95% error rate, and the value of abnormal value appearance number ratio. Based on the weighted mean value, the determination unit 140A determines whether the quality of the predictor is acceptable.

The aforementioned are an explanation of 'Wsum' which is the example of SUMMARY.

(Advantageous Effect which the Second Exemplary Embodiment Achieves)

According to the evaluation system 100A, it is possible to evaluate one predictor from a plural points of views which are different each other. The reason is that the determination unit 140A determines quality of the predictor by use of SUMMARY.

<Third Exemplary Embodiment>

Figure 8:
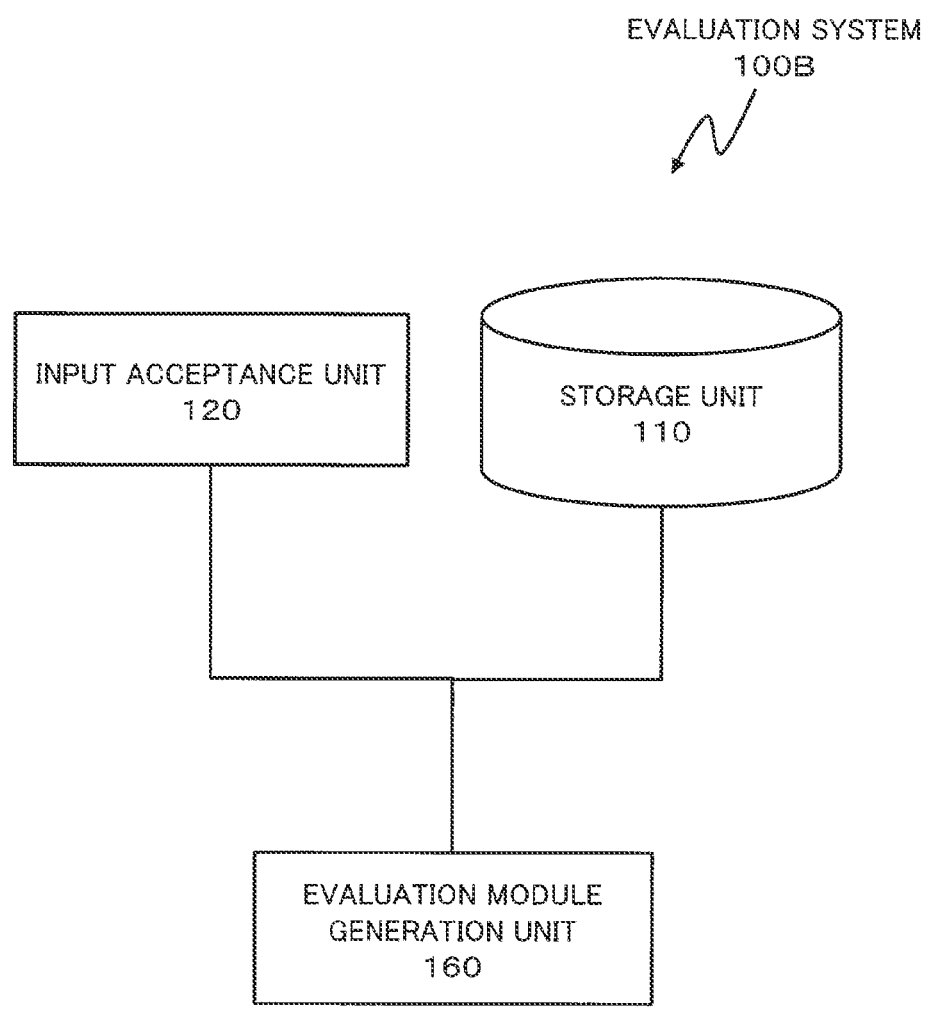
FIG. 8 is a block diagram illustrating a configuration of an evaluation system 100B according to a third exemplary embodiment of the present invention.

Next, a third exemplary embodiment which is based on the above-mentioned first exemplary embodiment will be described. FIG. 8 is a block diagram illustrating a configuration of an evaluation system 100B according to the third exemplary embodiment. The same reference sign is assigned to a component which is substantially identical to the component illustrated FIG. 1, and explanation on the identical component is omitted.

The evaluation system 100B illustrated in FIG. 8 includes a module generation unit 160B in place of the evaluation-index calculation unit 130.

The module generation unit 160B refers to the storage unit 110 based on an element which the input receiving unit 120 accepts. Based on LOSS, SAMPLING and STATISTIC which the input receiving unit 120 receives, the module generation unit 160B generates an evaluation module which calculates an evaluation index constituted by a combination of the elements. The generated evaluation module may be stored, for example, by a storage unit which is not illustrated in the drawing.

An operator inputs a data set into the evaluation module. The evaluation module carries out an operation defined by the evaluation index to the data set. As a result, the evaluation module calculates an evaluation-index value.

According to the evaluation system 100B of the third exemplary embodiment, it is possible to generate the evaluation module with ease.

<Fourth Exemplary Embodiment>

Figure 9:
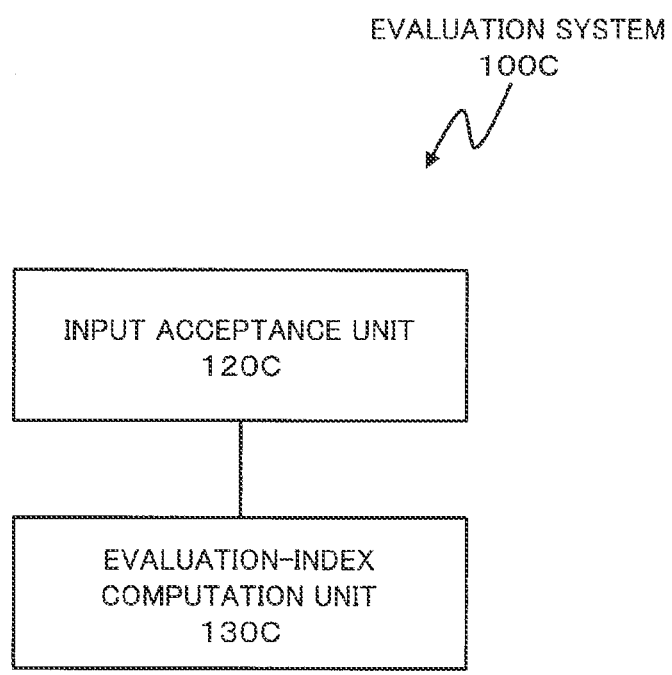
FIG. 9 is a block diagram illustrating a configuration of an evaluation system 100C according to a fourth exemplary embodiment of the present invention.

Next, a fourth exemplary embodiment will be described. FIG. 9 is a block diagram illustrating a configuration of an evaluation system 100C according to the fourth exemplary embodiment. As illustrated in FIG. 9, the evaluation system 100C includes an input receiving unit 120C and an evaluation-index calculation unit 130C.

The input receiving unit 120C receives designation of an element which constitutes the evaluation index.

The evaluation-index calculation unit 130C calculates an evaluation-index value for the inputted data set.

The data set is a set of sample data each of which is a combination of a predicted value which is a value outputted by a predictor, and a observed value which corresponds to the predicted value. The predictor is a function which takes a value of an explanation variable as input and outputs the predicted value. The evaluation-index value is a value of evaluation on appropriateness of the predicted value which the predictor outputs for the inputted explanation variable. The evaluation index is constituted by a combination of a plurality of elements. The plurality of elements include at least three elements of an element belonging to a first type, an element belonging to a second type, and an element belonging to a third type.

The element which belongs to the first type is an element which is used when evaluating one of the sample data. The element which belongs to the second type is an element which is used when applying weights for the sample data. The element which belongs to the third type is an element which is used when carrying out a statistical process to the plural sample data based on both of information outputted by the element belonging to the first type and information outputted by the element belonging to the second type.

The input receiving unit 120C receives designation of a specific element out of the elements which belong to the first type. The input receiving unit 120C accepts designation of a specific element out of the elements which belong to the second type. The input receiving unit 120C receives designation of a specific element out of the elements which belong to the third type.

The evaluation-index calculation unit 130C calculates the evaluation-index value based on the evaluation index which is constituted by a combination of the elements accepted by the input receiving unit 120C.

The exemplary embodiments and the specific examples described above may be combined as appropriate.

The configuration illustrated in each block diagram is a configuration shown for the sake of convenience of explanation. When implementing the present invention which has been described by exemplification of each exemplary embodiment, the present invention is not limited to the configuration shown in each of the block diagram.

Moreover, the above-mentioned reference sign in the drawing is assigned to each component for the sake of convenience as an example for helping in understanding, and assigning the reference sign does not intend that the present invention is limited to the aspect illustrated in the drawing.

The exemplary embodiments for carrying out the present invention have been described as above. However, the exemplary embodiments are for easy understanding of the present invention, and not for limitedly interpreting the present invention. The present invention can be varied and improved without departing from the spirit and scope, and includes equivalents of the present invention.

This application is based upon and claims the benefit of priority from Japanese Patent Application No. 2014-046314, filed on Mar. 10, 2014, the disclosure of which is incorporated herein in its entirety by reference.

INDUSTRIAL APPLICABILITY

The present invention can be applied to data mining.

REFERENCE SIGNS LIST

1 CPU
2 memory
3 storage apparatus
4 communication interface
5 input apparatus
6 output apparatus
7 drive apparatus
8 storage medium
100 evaluation system
100A evaluation system
100B evaluation system
100C evaluation system
110 storage unit
120 input receiving unit
120C input receiving unit
130 evaluation-index calculation unit
130C evaluation-index calculation unit
131 LOSS calculation unit
132 SAMPLING calculation unit
133 STATISTIC calculation unit
140 determination unit
140A determination unit
150 output unit
160B module generation unit

The invention claimed is:

1. An evaluation system, comprising:
a processor configured to function as:
an input receiving unit configured to receive designation of an element out of elements belonging to a first type, designation of an element out of elements belonging to a second type, and designation of an element out of elements belonging to a third type, each of the element belonging to the first type included in an evaluation index, each of the element belonging to the second type included in the evaluation index and each of the element belonging to the third type included in the evaluation index, the evaluation index being constituted by including, at least, the element belonging to the first type, the element belonging to the second type, and the element belonging to the third type, the element belonging to the first type being used when evaluating sample data, the element belonging to the second type being used when applying weight to sample data, the element belonging to the third type being used when carrying out statistical processing to a plurality of pieces of sample data based on information outputted by the element belonging to the first type and information outputted by the element belonging to the second type;
an evaluation-index calculation unit configured to calculate an evaluation-index value for a data set based on an evaluation index constituted by including the element received by the input receiving unit, the data set being a set of sample data each including a predicted value outputted by a predictor and a observed value corresponding to the predicted value, the predictor being a function taking a value of an explanation variable as input and outputting the predicted value, and the evaluation index value indicating a result of evaluation on appropriateness of the predicted value outputted by the predictor for the value of the explanation variable inputted; and
a determination unit configured to determine whether the predictor has desirable performance or not based on the evaluation-index value and a criterion, wherein
in relation to each of a first evaluation index and a second evaluation index, the input receiving unit receives designation of a specific element out of the elements belonging to the first type, designation of a specific element out of the elements belonging to the second type, and designation of a specific element out of the elements belonging to the third type,
the evaluation-index calculation unit calculates a first evaluation-index value by carrying out an operation defined by the first evaluation index to the data set, and calculates a second evaluation-index value by carrying out an operation defined by the second evaluation index to the data set, and
the determination unit determines based on the first evaluation-index value and the second evaluation-index value whether the predictor has desirable performance or not.

2. The evaluation system according to claim 1, wherein the evaluation-index calculation unit calculates the evaluation-index value by carrying out an operation defined by the evaluation index to the data set.

3. The evaluation system according to claim 1, further comprising:
a storage unit configured to store a plurality of elements belonging to the first type, a plurality of elements belonging to the second type and a plurality of elements belonging to the third type, wherein
the evaluation-index calculation unit carries out the operation by referring to the storage unit.

4. The evaluation system according to claim 3, wherein the input receiving unit receives designation of a specific element out of the plurality of elements stored in the storage unit.

5. The evaluation system according to claim 1, wherein the input receiving unit receives an input of information in which a name identifying the evaluation index, designation of a specific element out of the plurality of elements belonging to the first type, designation of a specific element out of the plurality of elements belonging to the second type, and designation of a specific element out of the plurality of elements belonging to the third type are associated each other.

6. The evaluation system according to claim 1, wherein the element belonging to the first type is an element which calculates a degree of difference between the predicted value and the observed value in relation to the sample data.

7. An evaluation method, comprising:

in relation to each of a first evaluation index and a second evaluation index, receiving designation of a specific element out of elements belonging to a first type, designation of a specific element out of elements belonging to a second type, and designation of a specific element out of elements belonging to a third type, each of the element belonging to the first type included in an evaluation index, each of the element belonging to the second type included in the evaluation index and each of the element belonging to the third type included in the evaluation index, the evaluation index being constituted by including, at least, the element belonging to the first type, the element belonging to the second type, and the element belonging to the third type, the element belonging to the first type being used when evaluating sample data, the element belonging to the second type being used when applying weight to sample data, the element belonging to the third type being used when carrying out statistical processing to a plurality of pieces of sample data based on information outputted by the element belonging to the first type and information outputted by the element belonging to the second type;

calculating a first evaluation-index value by carrying out an operation defined by the first evaluation index to a data set, and calculating a second evaluation-index value by carrying out an operation defined by the second evaluation index to the data set, the data set being a set of sample data each of which includes a predicted value that is a value outputted by a predictor and an observed value corresponding to the predicted value, the predictor being a function that takes a value of an explanation variable as input and outputs the predicted value, the first and second evaluation-index values being a value of evaluation on a degree of appropriateness of the predicted value which the predictor outputs for the value of the explanation variable inputted; and determining based on the first evaluation-index value and the second evaluation-index value whether the predictor has desirable performance or not.

8. A non-transitory computer readable medium storing a program for causing a computer to execute:

in relation to each of a first evaluation index and a second evaluation index, receiving designation of a specific element out of elements belonging to a first type, designation of a specific element out of elements belonging to a second type, and designation of a specific element out of elements belonging to a third type, each of the element belonging to the first type included in an evaluation index, each of the element belonging to the second type included in the evaluation index and each of the element belonging to the third type included in the evaluation index, the evaluation index being constituted by including, at least, the element belonging to the first type, the element belonging to the second type, and the element belonging to the third type, the element belonging to the first type being used when evaluating sample data, the element belonging to the second type being used when applying weight to sample data, the element belonging to the third type being used when carrying out statistical processing to a plurality of pieces of sample data based on information outputted by the element belonging to the first type and information outputted by the element belonging to the second type;

a second process of calculating a first evaluation-index value by carrying out an operation defined by the first evaluation index to a data set, and calculating a second evaluation-index value by carrying out an operation defined by the second evaluation index to the data set, the data set being a set of sample data each of which includes a predicted value that is a value outputted by a predictor and a observed value corresponding to the predicted value, the predictor being a function that takes a value of an explanation variable as input and outputs the predicted value, the first and second evaluation-index values being a value of evaluation on a degree of appropriateness of the predicted value which the predictor outputs for the value of the explanation variable inputted; and a third process of determining based on the first evaluation-index value and the second evaluation-index value whether the predictor has desirable performance or not.

* * * * *